(12) United States Patent
Chao

(10) Patent No.: US 12,634,252 B2
(45) Date of Patent: May 19, 2026

(54) AUTOMATICALLY GENERATING MULTIMEDIA CONTENT FOR MESSAGING IN A TELECOMMUNICATIONS NETWORK

(71) Applicant: T-Mobile USA, Inc., Bellevue, WA (US)

(72) Inventor: Chingming Chao, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 124 days.

(21) Appl. No.: 18/586,221

(22) Filed: Feb. 23, 2024

(65) Prior Publication Data

US 2025/0274417 A1 Aug. 28, 2025

(51) Int. Cl.
*G06F 15/16* (2006.01)
*H04L 51/04* (2022.01)
*H04L 51/10* (2022.01)

(52) U.S. Cl.
CPC .............. *H04L 51/10* (2013.01); *H04L 51/04* (2013.01)

(58) Field of Classification Search
CPC ................................ H04L 51/10; H04L 51/04
See application file for complete search history.

(56) References Cited

U.S. PATENT DOCUMENTS

| | | |
|---|---|---|
| 7,873,708 B2 | 1/2011 | Durand et al. |
| 8,140,649 B2 | 3/2012 | Durand et al. |
| 9,742,753 B2 | 8/2017 | Talley |
| 10,630,840 B1 | 4/2020 | Karp et al. |

| | | |
|---|---|---|
| 11,031,000 B2 | 6/2021 | Kim et al. |
| 11,032,421 B2 | 6/2021 | Karp et al. |
| 11,444,907 B2 | 9/2022 | Peltier et al. |
| 11,750,741 B2 | 9/2023 | Karp et al. |
| 11,848,012 B2 | 12/2023 | Hwang et al. |
| 2005/0136953 A1 | 6/2005 | Jo et al. |

(Continued)

FOREIGN PATENT DOCUMENTS

| | | |
|---|---|---|
| EP | 2103089 A2 | 9/2009 |
| EP | 2438720 A1 | 4/2012 |

(Continued)

OTHER PUBLICATIONS

International Search Report and Written Opinion from PCT App. No. PCT/US2025/016768 mailed Jun. 2, 2025, 10 pages.

*Primary Examiner* — John B Walsh
(74) *Attorney, Agent, or Firm* — Perkins Coie LLP

(57) ABSTRACT

A method can include receiving, from an input device processor associated with an input device, a request to transmit a text message to a terminating mobile device, the request comprises an invocation key indicating a user request to generate multimedia content. A method can include parsing the request to identify the invocation key and parsing the request to identify a set of descriptors for generating the multimedia content. A method can include generating, based on the set of descriptors, a prompt for providing to a generative AI model. A method can include transmitting the prompt to the generative AI model. A method can include receiving the generated multimedia content from the generative AI model. A method can include generating the text message including the generated multimedia content. A method can include transmitting, to the terminating mobile device, the text message comprising the generated multimedia content.

20 Claims, 10 Drawing Sheets

(56)                 References Cited

U.S. PATENT DOCUMENTS

| | | | |
|---|---|---|---|
| 2006/0019636 A1 | 1/2006 | Guglielmi et al. | |
| 2012/0066070 A1 | 3/2012 | Cai et al. | |
| 2017/0346937 A1* | 11/2017 | Adderly | H04M 1/72436 |
| 2020/0252355 A1 | 8/2020 | Peltier et al. | |
| 2022/0076666 A1 | 3/2022 | Trehan | |
| 2022/0109646 A1 | 4/2022 | Lakshmipathy | |
| 2022/0124055 A1 | 4/2022 | Sharifi et al. | |
| 2022/0343387 A1 | 10/2022 | Fredrich et al. | |
| 2024/0354555 A1* | 10/2024 | Knipfing | G06N 3/0455 |
| 2025/0124471 A1* | 4/2025 | Tan | G06Q 30/0271 |
| 2025/0165775 A1* | 5/2025 | Sathianathan | G06N 20/00 |

FOREIGN PATENT DOCUMENTS

| | | | |
|---|---|---|---|
| KR | 20050020911 A | 3/2005 | |
| KR | 20120113654 A | 10/2012 | |
| WO | 2009076650 A1 | 6/2009 | |
| WO | 2010141008 A1 | 12/2010 | |

* cited by examiner

600

908

910

904

Send a message with a picture of a mom and cake to my mom wishing her a happy birthday.

902

906

Input Device

AUTOMATICALLY GENERATING MULTIMEDIA CONTENT FOR MESSAGING IN A TELECOMMUNICATIONS NETWORK

BACKGROUND

Text messaging is used by countless individuals to communicate. Historically, text messages were sent as SMS (short message service) messages. These messages were limited to short, plain text messages. Over time, technologies such as MMS (multimedia messaging service) have expanded upon the original concept and enabled users to share images, video, and audio. In recent years, RCS (rich communication services) have become more widespread. Unlike SMS and MMS, which are transmitted over a telephony network, RCS requires a data connection. RCS lifts some limitations of SMS and MMS, such as limitations on character sizes, and adds enhanced functionality for group chats, message reactions, typing indicators, encryption, and so forth. Such services can be referred to collectively as "text messaging." Individuals commonly use text messaging to send greetings, share photos, and so forth.

With the emergence of generative AI, many individuals have unlocked a new route for creative expression, using generate AI tools to make images, video, written works, and so forth. Individuals may wish to share this content with others. For example, an individual may use a generative AI platform to generate an image, save the image, and then send the image to other individual via text message or another messaging platform.

BRIEF DESCRIPTION OF THE DRAWINGS

Detailed descriptions of implementations of the present invention will be described and explained through the use of the accompanying drawings.

Figure 1:
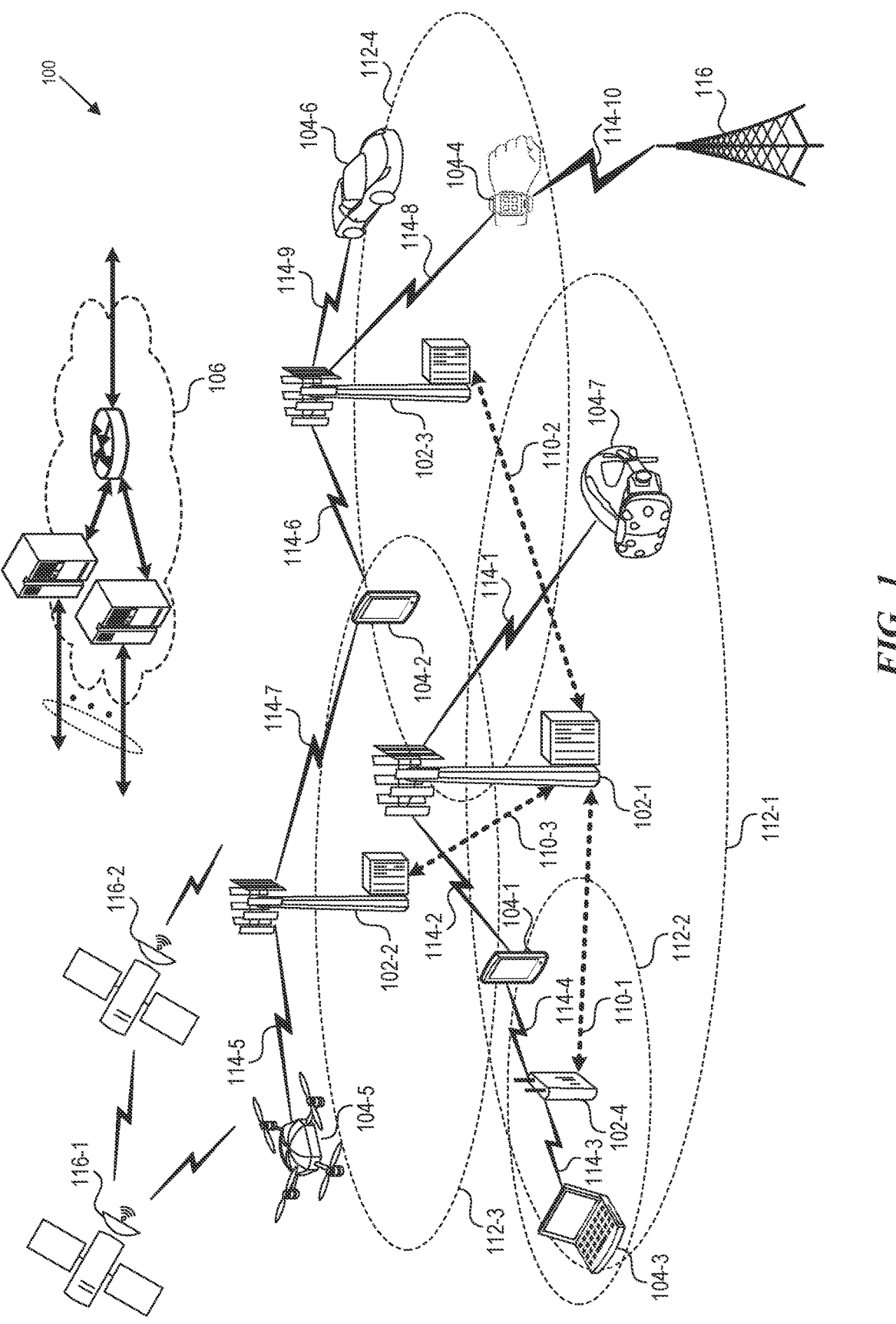
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Mobile telecommunications users often send text messages to one another. In some cases, text messages can include audio, video, images, or any other media. In conventional approaches, a user can select a media item to include in a message, for example from storage located on the user's smartphone and/or in a user's cloud storage services. However, a user may not have a photograph or other media item that matches what the user wishes to send. In some cases, a user can select an image from a web site or image service to include in a message. However, such images are pre-made and not customized by the user. Thus, while they may help convey the user's message, they may do so in an impersonal and imprecise manner. As used herein, the term "text message" is used to refer generally to SMS messages, MMS messages, and/or RCS messages, unless context clearly dictates otherwise.

Individuals are increasingly using generative artificial intelligence (generative AI) models to create images and other media items. In some cases, a user may want to share images and/or other media items created with generative AI, for example as an alternative to sending a photo taken by the user or an image retrieved from the internet or an image service. For ease of understanding, the term "generative AI image" is used herein. However, it will be appreciated that, unless context clearly dictates otherwise, any type of generated multimedia item (e.g., image, video, audio, or any combination thereof) can be used in the implementations described herein.

Generated multimedia content can allow the user to express greater control, creativity, and so forth. For example, the individual can specify what the image should contain, how the image should look (e.g., a mood, a painting style, etc.), and so forth. In some cases, a user can supply one or more reference images to a generative AI model along with a prompt explaining what the user wants the generative AI model to produce. As just one example, if a user wants to send a "Happy Birthday" message to their mother, the user could provide an image of their mother to the generative AI model along with a prompt instructing the generative AI model to produce a birthday-themed image (e.g., containing text and/or other features reminiscent of birthday celebrations, such as cake and/or candles) that includes the mother (or a representation of the mother based on the provided image).

While generative AI can enable users to generate images and/or other media items with relative ease, there remains significant friction with using generative AI models and sharing the results of generative AI models. Currently, if a user wants to share a generative AI image or other multimedia content with others via text message, the user proceeds to a generative AI model (e.g., to a web site and/or application for interacting with the generative AI model), provides a prompt to the generative AI model and optionally one or more reference images on which to base the generated image or other multimedia content, and receives an output image or other generated multimedia content. The user can save the output image or other generated multimedia content to a local device (e.g., to a smartphone) or cloud storage, and can then attach the image to a message, which the user can then send to a destination. Alternatively, the user can copy the output image or other multimedia content and paste the output image or other multimedia content into a text message application for sending to the destination. These steps can be cumbersome and time-consuming. Thus, users may be reluctant to make use of generative AI when sending text messages to others.

The present application describes approaches that can be used to decrease the friction encountered by users when making use of generative AI in conjunction with text messaging. In some implementations, users can include a command in a text message, and the command can include a request to generate an image or other multimedia content using a generative AI model. In some implementations, in response to such a command, a generative AI image or other multimedia content can be created and sent to the recipient of the text message.

In some implementations, conventional text messaging applications can be used. For example, the text messaging application can include an input field for the user to specify their message. In some implementations, the user can include a request for generative AI in the input field. Users also send text messages via other methods. For example, users can send text messages using a voice assistant. The voice assistant can be built-in to the user's phone, installed as an application on the user's phone, can be a standalone device (e.g., an APPLE HOMEPOD, GOOGLE HOME, or AMAZON ALEXA device), and so forth. In conventional text messaging applications, the message can be sent to a telecommunications service (e.g., to a multimedia messaging service center (MMSC)). In the case of a voice assistant, an input (e.g., voice command) provided by the user can undergo some processing. For example, the voice command can be converted to text, and further processing can be carried out on the text, for example to determine the type of action the user wants to take, the application or service the user wants to use, and so forth.

In some cases, additional processing can be performed before a text message is delivered to a recipient, such as sending information to third-party services (e.g., generative AI services, shopping services, weather services, and so forth). When a user submits a voice request for a text message or sends a text message using a text messaging application, the text message can be processed to some degree outside of the mobile telecommunications network before being routed through the mobile telecommunications network for delivery to a recipient. For example, in conventional multimedia message service (MMS) messages, messages can undergo processing before delivery to a recipient. The processing can include, for example, transcoding video, scaling images, or otherwise modifying content of the MMS message to better ensure compatibility with a receiving device. The same or similar approaches can be used to make requests for generated multimedia content in some implementations as described herein.

Requests for generative AI can be provided in various forms. Where a voice assistant or other software other than a conventional text messaging application is used to send text messages, a request can include, for example, an invocation key, an intent, a destination, and/or one or more descriptors. The invocation key can indicate an application or service the user wishes to use. In some implementations, the invocation key can be a string of predetermined characters. The intent can indicate an action the user wants to undertake. The descriptors can include additional details about the action, for example input data to be used in carrying out the action. The destination can indicate where results of the action should be sent. For example, in the case of translation, a request can take a form such as "tell Translator App to send a message in Spanish that says Good Morning to Amy." The phrase "tell Translator App" can be an invocation key that identifies "Translator App" as the target for the request. The phrase "send a message" can indicate the user's intent, e.g., the action to be undertaken by Translator App. The phrase "in Spanish that says Good Morning" can be a set of descriptors that provides additional details about the action. For example, the set of descriptors indicates a language for translation (Spanish) and the phrase to be translated ("Good Morning"). The phrase "to Amy" can indicate a destination (Amy) for the output of the translation. In some implementations, a request may not include all of the above-described elements and/or some elements may be combined. For example, in some implementations, a user can provide a command such as "Tell Amy 'Good Morning' in Spanish," and a voice assistant or other software can determine that the Translator App should be used to carry out the user's request.

In the case of a text messaging application being used to make requests, similar approaches can be used. In some implementations, requests can be relatively simple. For example, a destination can be determined based on who the user is messaging, and thus may not be included in the request. In some cases, a user may include text or other content unrelated to the request in the body of a text message. Thus, it can be significant to determine which portion of a message corresponds to a request and which portion does not. In some cases, an invocation key can have a particular format that makes it easier to identify requests. For example, invocation keys can begin with a special character such as "#" or "!." For example, a user can send a text message such as "#translateGoodMorningToSpanish." "#translate" can be an invocation key that indicates the user wishes to use a translation service. "GoodMorningToSpanish" can be a set of descriptors that indicates the phrase to be translated ("Good Morning") and the target language (Spanish). In some implementations, all the words in a request can be strung together without spaces, as shown above, and a space, line break, period, end of the text message, etc., can indicate the end of the request. In some implementations, spaces can be allowed. For example, the request above can instead be represented as "#translate Good Morning to Spanish." Such an approach can be easier to read and may be easier for a user to input (e.g., autocompletion may work better when words are separated by spaces). However, such an approach can make it more difficult to determine the end of a request. In some implementations, a termination character (e.g., a period, semicolon, etc.) can be used to indicate the end of a request. In some implementations, all text coming after the invocation key can be treated as part of the request.

In some implementations, a user's request can be enriched based on information known or determined about the user, such as the user's age, location, current weather conditions in the user's location, forecasted weather conditions in the user's location, upcoming events in a user's calendar, the user's contacts, the user's photos (e.g., stored on the user's smartphone, in cloud storage of the user, etc.), and/or other information.

For example, if a user provides a request such as "Send a picture of my daughter in a graduation gown congratulating her for graduating," a system can be configured to retrieve an image of the user's daughter from the user's photos, which can be provided to a generative AI model for use in generating an image. As an example, the user's daughter can be identified based on the user's contacts, photos of the user's daughter can be determined based on album name, tags associated with photos, etc. In some implementations, facial recognition can be used to analyze the user's photos and identify people, pets, places, etc., depicted in the photos.

In some implementations, current or forecasted weather can be used to enrich a generative AI request. For example, if a user is located in an area experiencing high winds and heavy rainfall, and the user provides a request such as "#createImageTheWeatherOutsideIsFrightful," a prompt provided to a generative AI model can be enriched to include information about the weather in the user's location. For example, instead of a prompt that says, "frightful weather," the generative AI request can be enriched to say, "frightful weather with high winds and heavy rainfall." This can result in generative AI images that are more likely to reflect the intent of the user. For example, without the enrichment, the generative AI model may produce an image that depicts snow, which can be unlikely to reflect what the user wanted to show.

In some implementations, a user's calendar can be used to enrich a request. For example, a calendar can be used to determine upcoming travel plans, upcoming events, and so forth. As one example, a user can provide a request such as "#createImage vacation," and information from the user's calendar can be used to determine a location of the vacation, which can be used to enhance a prompt provided to a generative AI model. For example, instead of providing a prompt that says "vacation," a system can provide a prompt that says "vacation in Prague" based on calendar events that indicate the user is traveling to Prague soon.

In some implementations, additional features can be provided, such as translation. For example, a user can provide a request such as "Send a picture wishing my mom a happy birthday in French," and a system can translate "happy birthday" into French. The French phrase can then be incorporated in a generative AI image.

In some implementations, delayed sending can be an optional feature. For example, a user may wish to specify a particular time when a message including a generative AI image or other multimedia content should be sent. For example, a user may want to schedule sending a "happy birthday" message for the morning of the recipient's birthday, or a user sending a "happy new year" message may want the message to be sent at midnight.

While generative AI can be useful and/or fun for users, it also presents significant risks. For example, generative AI can be used to generate images containing false, misleading, and/or upsetting information. For example, a malicious actor can use generative AI to generate an image of someone's property, pet, child, etc., in a setting that indicates that the property, pet, child, etc., has been stolen or abducted. As another example, generative AI can be used to create images that depict violence or other situations that viewers may find upsetting. Malicious individuals may utilize generative AI to scam, harass, or inflict emotional harm.

Accordingly, it can be important to impose restrictions on the use of generative AI to reduce the risk of such abuses. For example, in some implementations, a system can be configured to reject requests for violent or otherwise upsetting imagery. In some implementations, a generative AI model may reject such requests.

In some embodiments, the use of generative AI can be restricted. For example, in some embodiments, users may only be able to send text messages including generative AI content to other users with whom the user has previously interacted. In some implementations, the use of generative AI may only be permitted if the requestor has sent a minimum number of messages to the recipient, if the recipient has sent a minimum number of messages to the requestor, if the request and recipient have been communicating for a minimum amount of time, if the recipient is in the requestor's contacts list, if the recipient has opted in to receiving messages that include generative AI, and so forth.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
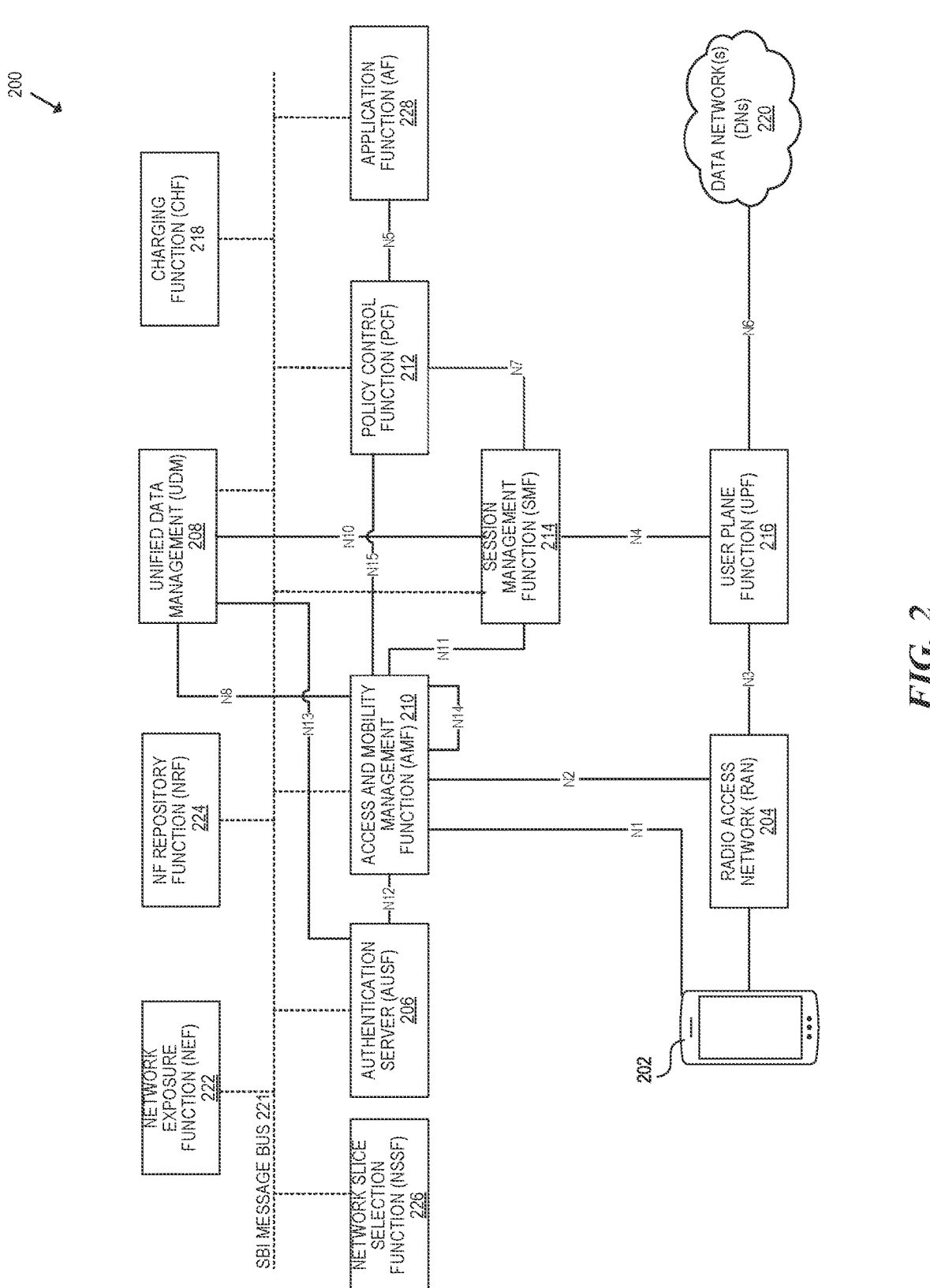
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, off-loading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Generative AI Messaging via Virtual Assistant

Figure 3:
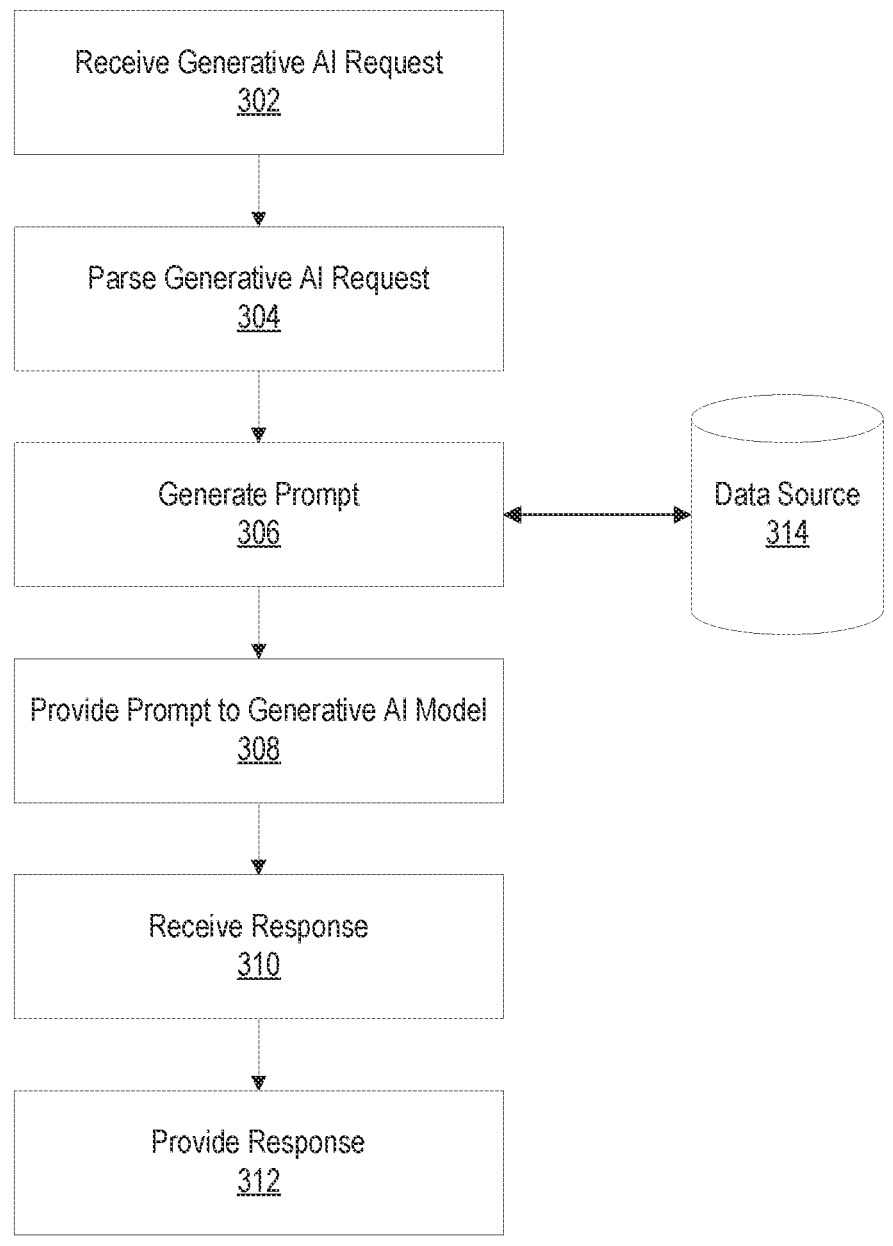
FIG. 3 is a block diagram that illustrates an example process for generating multimedia and providing said multimedia content to a terminating mobile device according to some implementations.

FIG. 3 is a block diagram that illustrates an example process for generating multimedia content (e.g., an image, a video, an audio, or any combination thereof) and providing said multimedia content to a terminating mobile device (e.g., a destination smartphone) according to some implementations. At operation 302, a system can receive a generative AI request from a user. At operation 304, the system can parse the generative AI request. For example, parsing the request can include determining descriptors for the multimedia content, a destination for the multimedia content, and so forth. Descriptors can include, for example, the subject matter of the multimedia content, the style of the multimedia content (e.g., sepia, colorful, black and white, oil painting, watercolor, film grain, etc.). The destination can include, for example, a phone number to send the other multimedia content to, a person to send the multimedia content to, etc. For example, a destination phone number can be determined by looking up the name of the person in the user's contacts or address book. For example, if a user provides a voice instruction to "send a message to my mom wishing her a happy birthday showing a mother blowing out candles on a cake," the system can parse the instruction into one or more parts. For example, "send a message" can be a command to send a text message, "to my mom" can be the destination of the message, and "wishing her a happy birthday showing a mother blowing out candles on a cake" can be a set of descriptors for a generative AI request. The descriptors for the generative AI request can be used in generating a prompt to provide to a generative AI model.

At operation 306, the system can generate a prompt for a generative AI model. For example, a prompt can be "create an image showing a mother blowing out candles on a birthday cake and wishing her a happy birthday." In some cases, the system can be configured to include a reference image for use in generating the multimedia content and/or to include other information, such as a location, current weather condition, forecasted weather condition, etc. The reference image and/or the other information can be gathered from a data source 314, such as the user's phone, cloud storage, a weather service, the user's calendar, etc. In the example above, the user could, instead of saying "a mother," say "my mother." In some implementations, such a difference in phrasing can cause the system to use an image of the user's mother (e.g., from an image on a user's device or cloud storage) as an input to the generative AI model, such that the generative AI image will more closely resemble the user's mother.

At operation 308, the system can provide the prompt to a generative AI model (e.g., via an application programming interface (API) provided for interacting with the generative AI model). At operation 310, the system can receive a response from the generative AI model. The response can include, for example an error message indicating that generating the multimedia content failed or the generated multimedia content. In some implementations, the system may not receive an error message or the multimedia content from the generative AI model. In some implementations, the system can determine a failure to generate the multimedia content if the multimedia content is not received from the generative AI model in a threshold period of time (e.g., 10 seconds, 20 seconds, 30 seconds, 1 minute, 2 minutes, 5 minutes, or any other time period). If generating the multimedia content succeeded, the system can provide the multimedia content to the destination at operation 312. In some implementations, the multimedia content can be provided to the user additionally or alternatively. For example, the multimedia content can be sent to a smartphone of the user. In some implementations, the user can review the multimedia content and can decide whether or not the multimedia content should be delivered to the destination. For example, if the user is unhappy with the multimedia content, the user can elect not to send the multimedia content and can, for example, request other multimedia content using a different and/or more specific request.

There can be various approaches to sending text messages using a voice assistant or other software platform or application. For example, in some cases, a user can provide input and the software platform can perform processing on the received input prior to sending a message to a mobile telecommunications network (e.g., to an MMSC). In some cases, the MMSC can receive a message and perform processing prior to delivery of the message to a terminating mobile device (e.g., a recipient of the message). Techniques for using a smartphone or similar equipment to sending text messages including generative AI multimedia content are described in U.S. patent application Ser. No. 18/586,128, filed Feb. 23, 2024, the entire contents of which are incorporated herein by reference.

The 3GPP has defined a set of standards used for sending MMS messages in mobile networks. The MMS architecture standards define a variety of interfaces between components. For example, the MM1 interface is used as an interface between a user agent operating on a user equipment and an MMSC. The MM7 interface is used to enable communication between the MMSC and a value-added service (VAS). The MM7 interface utilizes SOAP over an HTTP transport layer. According to some implementations, an MM7 interface can be used to enable communication between an MMSC and a generative AI model.

Figure 4:
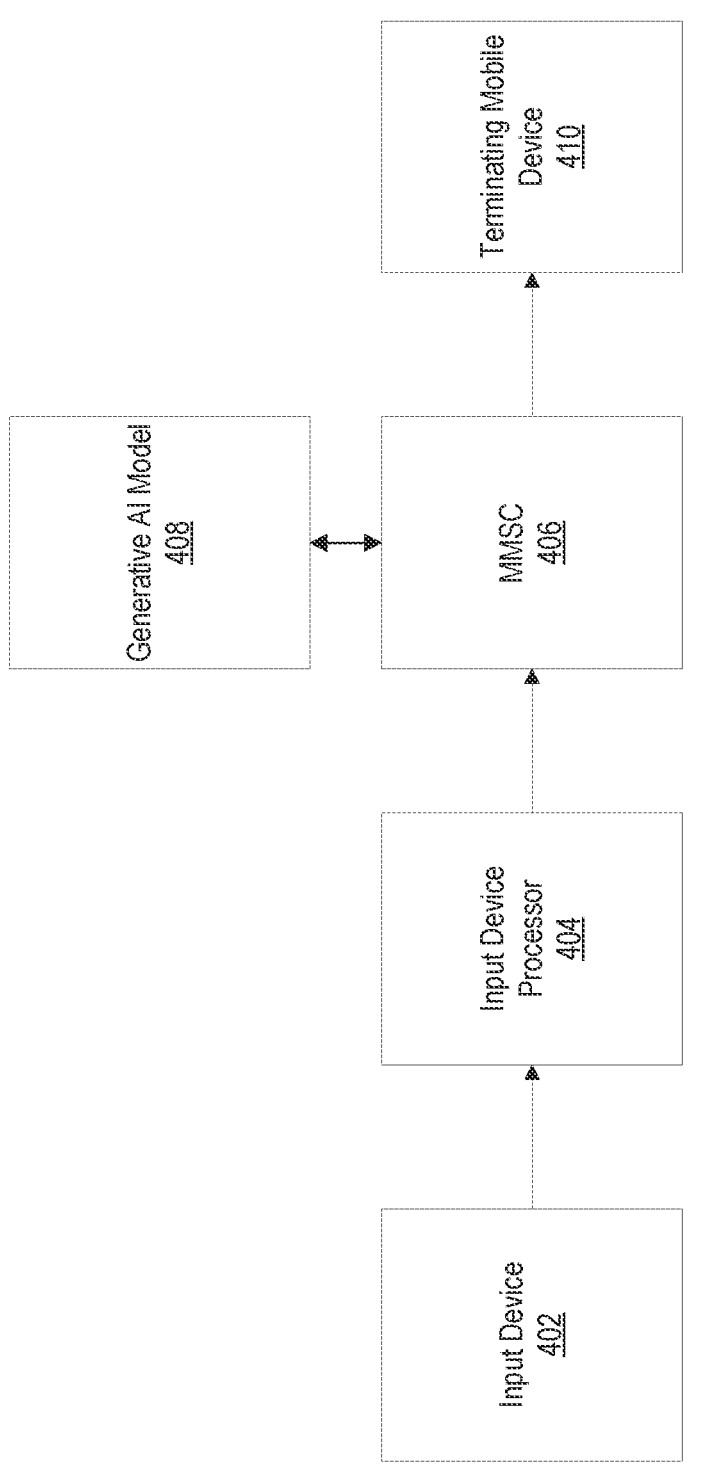
FIG. 4 is a block diagram that illustrates various components that can be used for sending text messages including generative AI multimedia content according to some implementations.

FIG. 4 is a block diagram that illustrates various components that can be used for sending text messages including generative AI multimedia content. An input device 402 (e.g., a computer, voice assistant, etc.) can receive input from a user. An input device processor 404 can process the input received by the input device. In some cases, the input device processor 404 can be separate from the input device 402, for example the input device processor 404 can be embodied in a cloud server that receives and processes inputs from the input device 402. In some cases, the input device process can be built into the input device 402. For example, a voice assistant can be configured to locally process inputs from the user. The input device processor 404 can communicate with a wireless telecommunications network to send a text message. For example, the input device processor 404 can communicate with a multimedia messaging service center 406 of the wireless telecommunications network (e.g., via an MM7 interface). The multimedia messaging service center 406 can communication with a generative AI model 408. For example, the multimedia messaging service center 406 can send a prompt to the generative AI model 408 and can receive generated multimedia content from the generative AI model 408. The MMSC can generate a text message and send the text message to a terminating mobile device 410.

Figure 5:
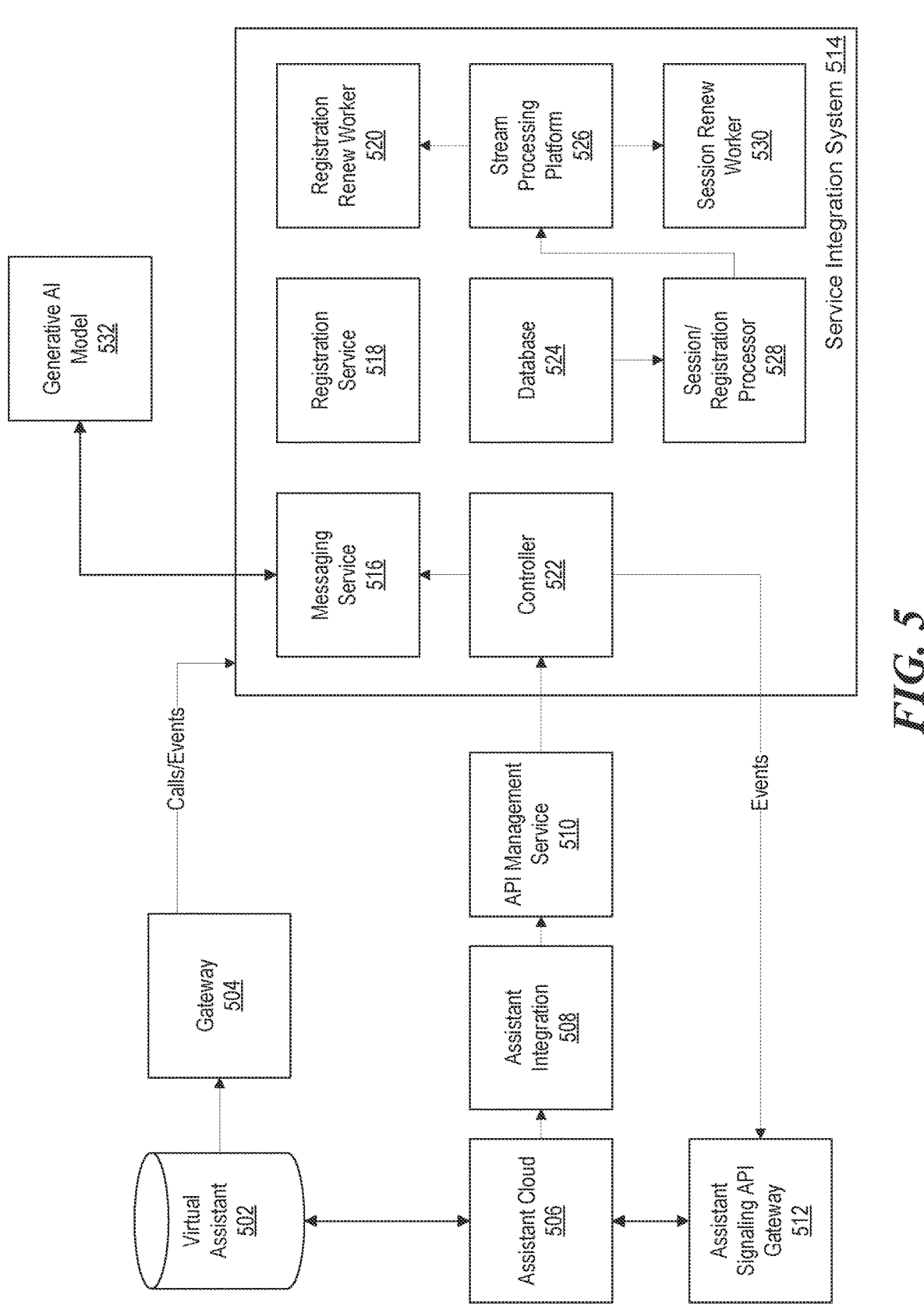
FIG. 5 is a block diagram that illustrates various components that can be involved in generating and sending text messages including multimedia content generated by a generative AI model according to some implementations.

While FIG. 4 shows a relatively simple configuration that involves a wireless telecommunications network utilizing a generating AI model to send generated multimedia content to a terminating mobile device, it will be appreciated that in some implementations, additional components can be involved. FIG. 5 is a block diagram that illustrates various components that can be involved in generating and sending text messages including multimedia content generated by a generative AI model according to some implementations.

In FIG. 5, a virtual assistant 502 can be in communication with a gateway 504 that can transmit calls and/or events to a service integration system 514. The virtual assistant 502 can be in communication with an assistant cloud 506. The assistant cloud 506 can, for example, process requests provided to the virtual assistant 502 by a user. The assistant cloud 506 can be in communication with an assistant integration 508. The assistant integration 508 can, for example, act as an interface between the assistant cloud 506 and the service integration system 514. In some implementations, the assistant integration 508 can be in communication with an API management service 510, and the API management service 510 can be in communication with the service integration system 514, for example in communication with a controller 522 of the service integration system 514. The API management service 510 can be used to, for example, manage API changes so that services continue to function as expected even when an API changes. In some implementations, the assistant cloud 506 and the service integration system 514 can be in communication with an assistant signaling API gateway 512. For example, the controller 522 of the service integration system 514 can send events to the API gateway 512. The service integration system 514 can include a messaging service 516, registration service 518, registration renew worker 520, session stream processing platform 526, session renew worker 530, session registration process 528, and database 524. In some implementations, the messaging service 516 can be, can include, and/or can be in communication with a multimedia messaging service center (MMSC). The messaging service 516 can be in communication with a generative AI model 532. For example, the messaging service 516 can generate a prompt for the generative AI model 532 and can provide the prompt to the generative AI model 532. The generative AI model 532 can return a response to the messaging service 516, which can include generated multimedia content.

Figure 6:
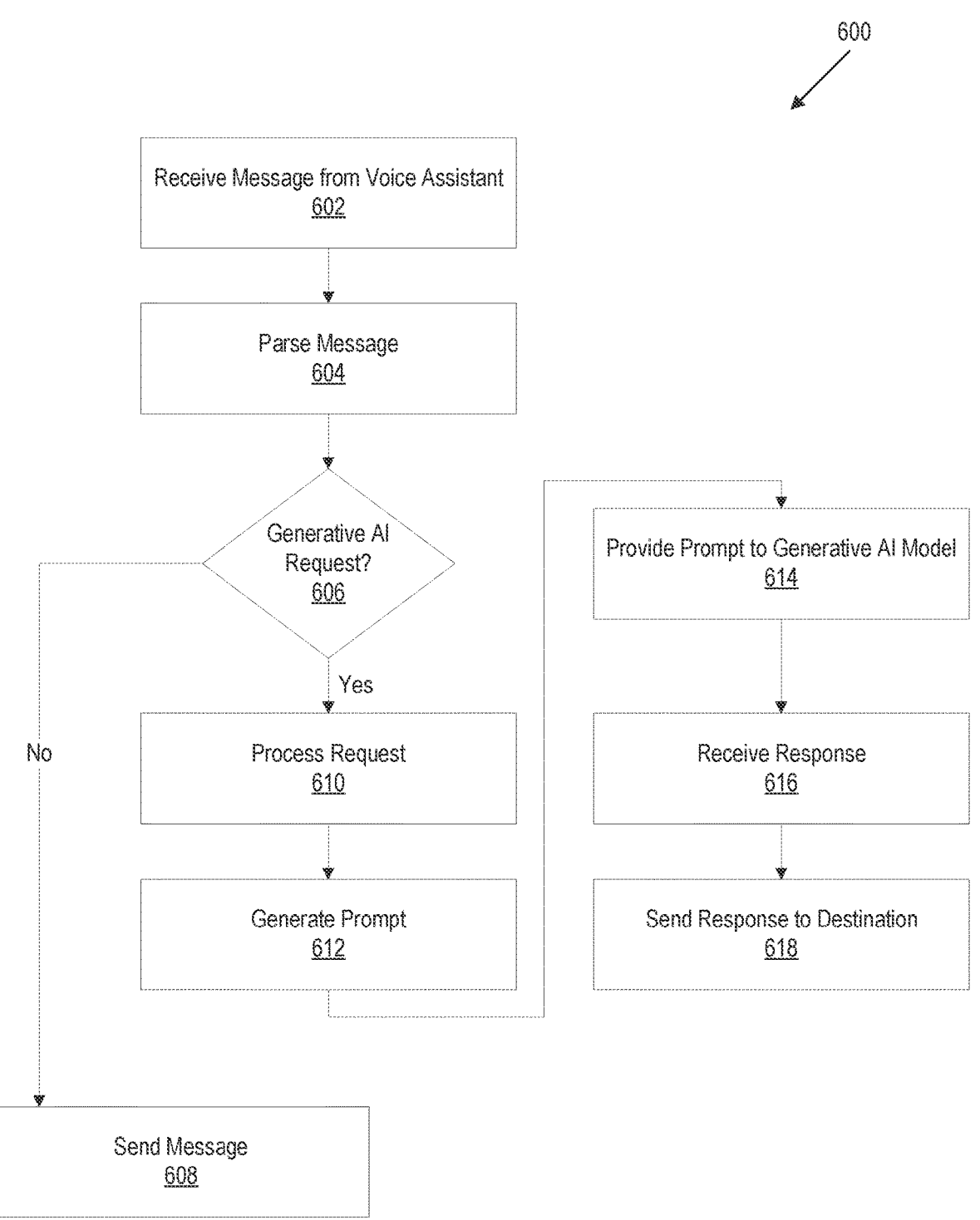
FIG. 6 is a block diagram illustrating an example process for generating and sending a text message including generated multimedia content according to some implementations.

FIG. 6 is a block diagram illustrating an example processor for generating and sending a text message including generated multimedia content according to some implementations. In the process 600, wireless telecommunications network infrastructure can be involved in communicating with a generative AI model. At operation 602, the wireless telecommunications network can receive a message originating from a voice assistant or other input device, for example directly from the input device or from a cloud service in communication with the input device. At operation 604, the wireless telecommunications network can parse the received message. At decision point 606, the wireless telecommunications network can determine if the message includes a generative AI request. If not, the wireless telecommunications network (e.g., an MMSC of the wireless telecommunications network) can send a text message to a terminating mobile device at operation 608. If the message includes a request for generated multimedia content, the wireless telecommunications network can process the request at operation 610, for example to determine a destination, a set of descriptors, a time to send the message, etc. At operation 612, the wireless telecommunications network can generate a prompt for a generative AI model based on the received descriptors. At operation 614, the wireless telecommunications network can provide the prompt to a generative AI model. At operation 616, the wireless telecommunications network can receive a response from the generative AI model, for example including the generated multimedia content. At operation 618, the wireless telecommunications network (e.g., the MMSC) can send the response to a terminating mobile device.

In some implementations, an input device or input device processor can be configured to communicate with a generative AI model. Such an approach can be desirable because, for example, it does not require modification or configuration of a wireless telecommunications network. However, such an approach can complicate development as code may need to be written to enable different input devices and/or input device processors to interact with a generative AI model.

Figure 7:
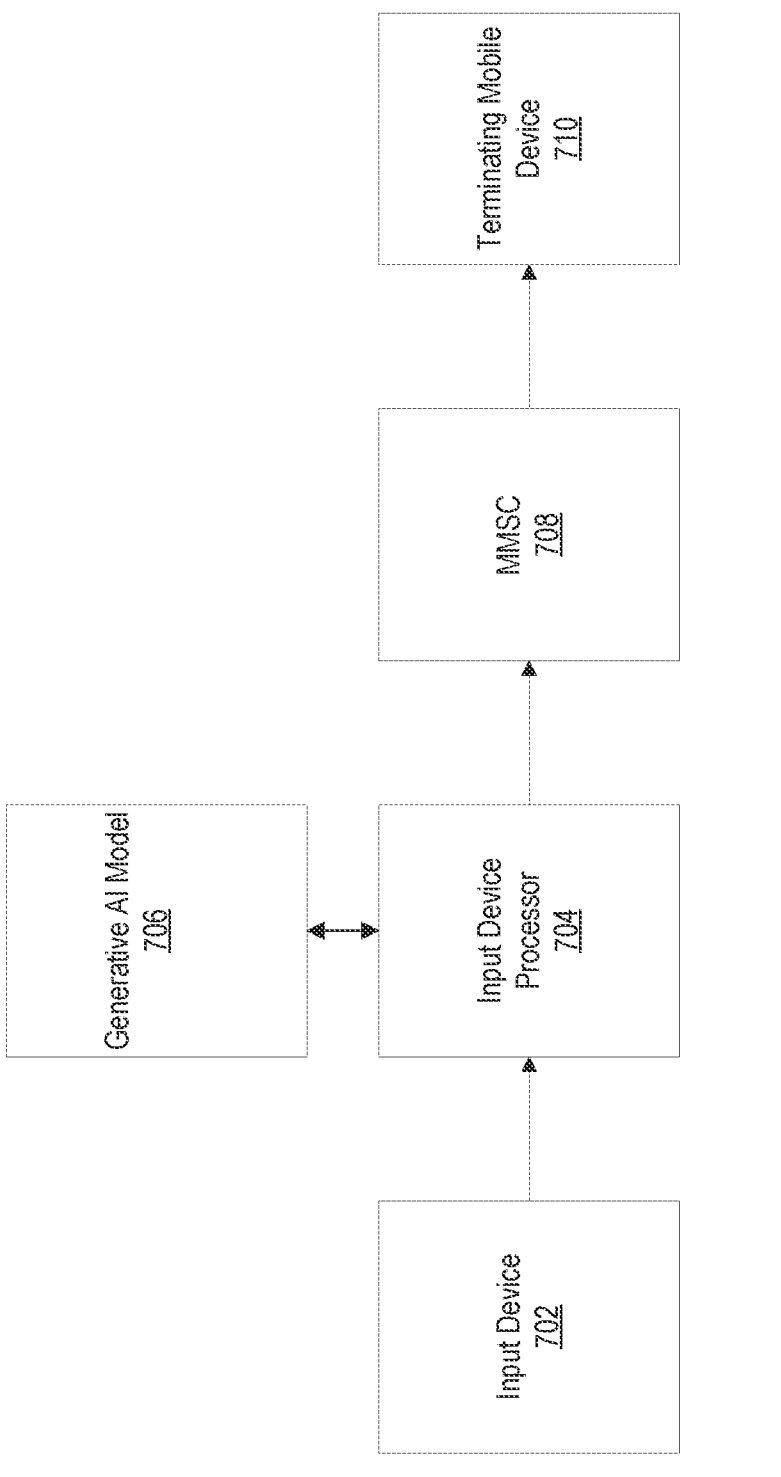
FIG. 7 is a block diagram illustrating various components that can be involved in generating and sending text messages including generated multimedia content according to some implementations.

FIG. 7 is a block diagram illustrating various components that can be involved in generating and sending text messages including generated multimedia content according to some implementations. An input device 702 can communicate with an input device processor 704. As described herein, in some cases the input device processor 704 can be a cloud service. In some cases, the input device processor 704 can be included in the input device 702, for example where the input device 702 uses local processing of user inputs. The input device processor 704 can communicate with a generative AI model 706. For example, the input device processor 704 can generate a prompt based on a user input and can transmit the prompt to the generative AI model 706. The generative AI model 706 can return generated multimedia content to the input device processor 704. The input device processor 704 can generate a text message to be sent to a terminating mobile device. The input device processor 704 can send the text message to an MMSC 708. The MMSC 708 can transmit the text message to a terminating mobile device 710.

Figure 8:
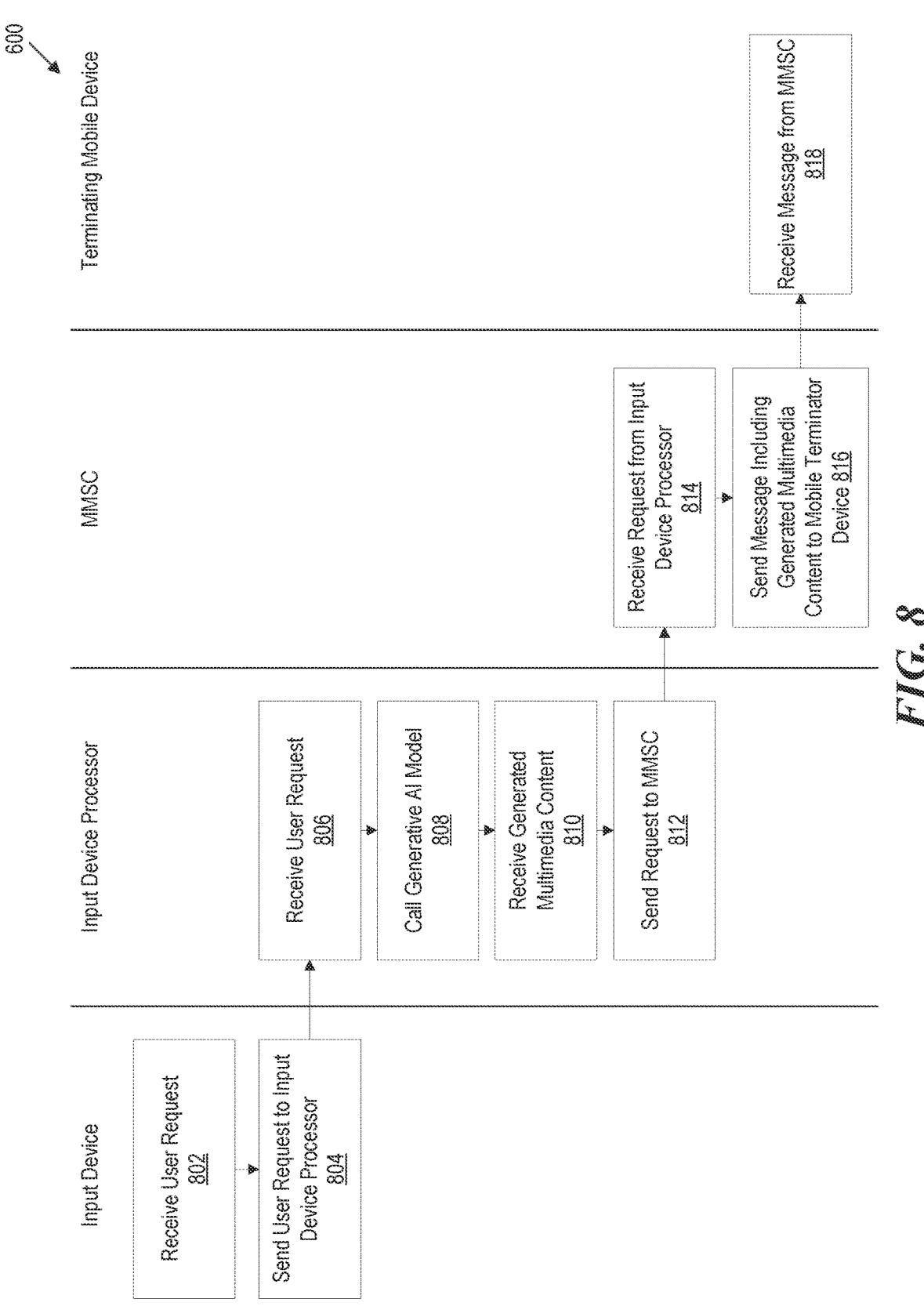
FIG. 8 is a block diagram illustrating an example process for sending a text message including generated multimedia content according to some implementations.

FIG. 8 is a block diagram illustrating an example process for sending a text message including generated multimedia content according to some implementations. At operation 802, an input device can receive a user request, for example an audio request, to send a text message that includes generated multimedia content to a terminating mobile device. At operation 804, the input device can send the user request to an input device processor. At operation 806, the input device processor can receive the user request. At operation 808, the input device processor can call a generative AI model. For example, the input device processor can generate a prompt based on the user request (e.g., based on a set of descriptors included in the user request) and can send the prompt to a generative AI model. At operation 810, the input device processor can receive generated multimedia content from the generative AI model. At operation 812, the input device processor can generate a text message including the generating multimedia content and can send a request to an MMSC (or other infrastructure provided by a wireless telecommunications company, such as the service integration system 514 of FIG. 5) to send the text message to a terminating mobile device. At operation 814, the MMSC can receive the request from the input device processor, the request including the text message. At operation 816, the MMSC can send the text message including the generated multimedia content to the terminating mobile device. At operation 818, the terminating mobile device can receive the text message.

Figure 9:
FIG. 9 is a diagram that illustrates an example use of generative AI messaging according to some implementations.

FIG. 9 is a diagram that illustrates an example use of generative AI messaging according to some implementations. In FIG. 9, a user 902 provides a voice input 904 to send a message with a picture of a mom and cake to the user's mom wishing her a happy birthday. The voice input 904 can be received by an input device 906, e.g., a voice assistant. In some implementations, the input device 906 can generate a text message including generated multimedia content as described herein. In some implementations, the input device 906 can send the voice input 904 or a request based on the voice input 904 to a mobile telecommunications network (e.g., to an MMSC or service integration system as described herein), which can communicate with a generative AI model to obtain generated multimedia content for inclusion in a text message. The text message can be delivered to a terminating mobile device 908. In the example of FIG. 9, the text message comprises a generated image 910 depicting a person, a birthday cake, and a banner saying, "Happy Birthday."

Computer System

Figure 10:
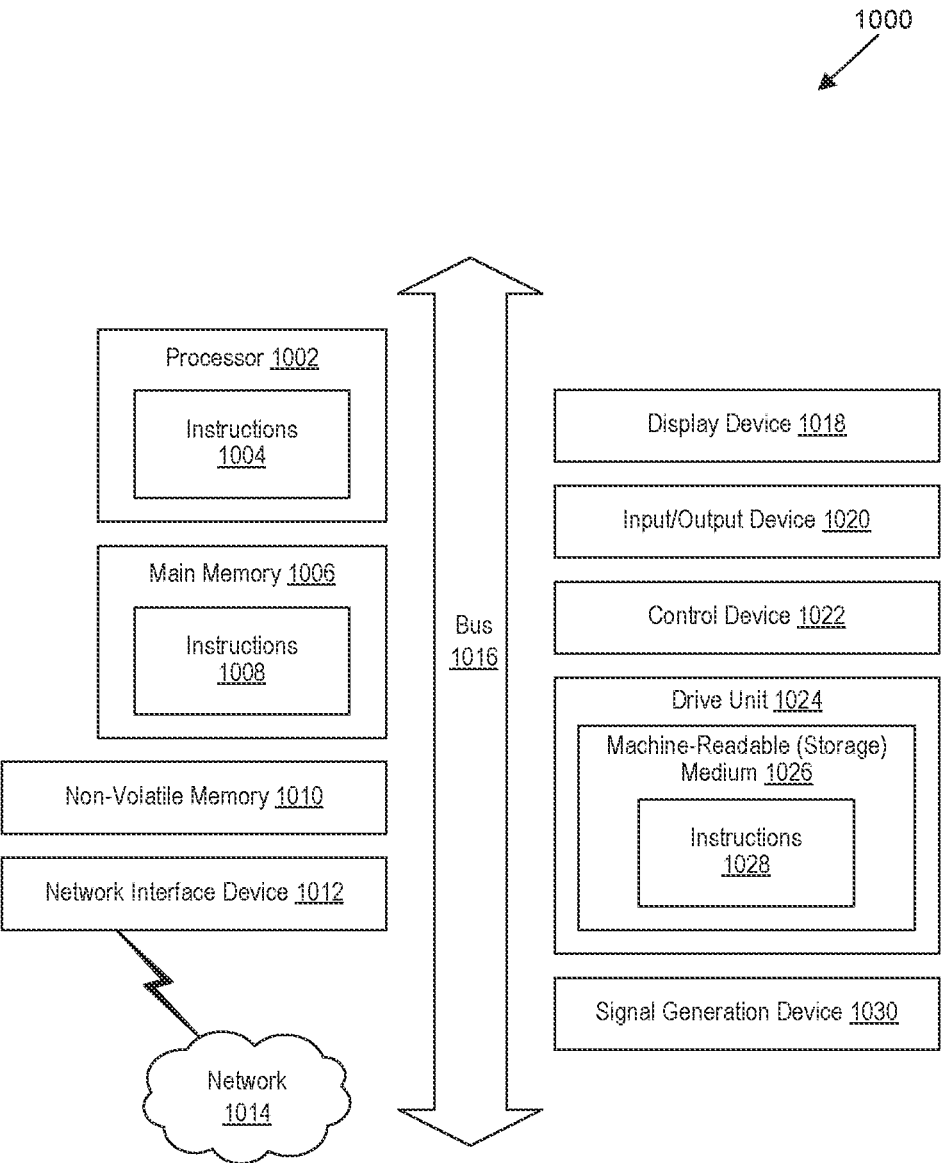
FIG. 10 is a block diagram that illustrates an example of a computer system 1000 in which at least some operations described herein can be implemented.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, a video display device 1018, an input/output device 1020, a control device 1022 (e.g., keyboard and pointing device), a drive unit 1024 that includes a machine-readable (storage) medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the figures and any other components described in this specification can be implemented.

The computer system 1000 can take any suitable physical form. For example, the computing system 1000 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1000. In some implementations, the computer system 1000 can be an embedded computer system, a system-on-chip (SOC), a single-board computer system (SBC), or a distributed system such as a mesh of computer systems, or it can include one or more cloud components in one or more networks. Where appropriate, one or more computer systems 1000 can perform operations in real time, in near real time, or in batch mode.

The network interface device 1012 enables the computing system 1000 to mediate data in a network 1014 with an entity that is external to the computing system 1000 through any communication protocol supported by the computing system 1000 and the external entity. Examples of the network interface device 1012 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/or associated caches and servers) that store one or more sets of instructions 1028. The machine-readable medium 1026 can include any medium that is capable of storing, encoding, or carrying a set of instructions for execution by the computing system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computing system 1000 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

What is claimed is:

1. A method for generating and transmitting a generative artificial intelligence (AI) multimedia content via a mobile telecommunications network comprising:

receiving, from an input device processor associated with an input device, a request to transmit a text message to a terminating mobile device, wherein the request comprises an invocation key indicating a user request to generate multimedia content, wherein the invocation key contains a predetermined special character, and wherein the request is input using a text messaging application of the input device;

parsing the request to identify the invocation key indicating the user request to generate the multimedia content;

parsing the request to identify a set of descriptors for generating the multimedia content;

generating, based on the set of descriptors, a prompt for providing to a generative AI model;

transmitting, to the generative AI model, the generated prompt, wherein the generative AI model generates the multimedia content, wherein the generated prompt is transmitted to the generative AI model by a multimedia messaging service center of the mobile telecommunications network via an MM7 interface;

receiving, by the multimedia messaging service center from the generative AI model, the generated multimedia content;

generating, by the multimedia messaging service center, the text message including the generated multimedia content; and transmitting, to the terminating mobile device using the multimedia messaging service center, the text message comprising the generated multimedia content.

2. The method of claim 1, wherein the invocation key comprises a string of predetermined characters indicating the user request for generating multimedia content.

3. The method of claim 1, wherein the multimedia content comprises at least one of: an image, a video, or an audio.

4. The method of claim 1, further comprising, prior to transmitting the multimedia content to the terminating mobile device:

transmitting, to the input device, the multimedia content;

receiving, from the input device, an indication to send the generated multimedia content to the terminating mobile device.

5. The method of claim 1, wherein the request includes an indication of a reference image for generating the multimedia content, and wherein transmitting the generated prompt comprises transmitting the reference image.

6. The method of claim 5, wherein the reference image is selected from one of: a local storage of the input device or a connected cloud service of a user of the input device.

7. The method of claim 1, further comprising, prior to generating the prompt:

determining one or more enrichments based on information about a user of the input device, the information including one or more of: an age of the user, a location of the user, a current weather at the location of the user, a forecasted weather at the location of the user, or an upcoming event of the user.

8. The method of claim 1, wherein the request further comprises a request to translate a message, wherein the method further comprises translating the message.

9. The method of claim 1, further comprising, prior to transmitting the text message to the terminating mobile device:

determining that a user of the input device has received at least a minimum number of messages from a receiving user.

10. The method of claim 1, wherein transmitting the text message to the terminating mobile device comprises transmitting the text message to a second, different multimedia messaging service center than a multimedia messaging service center involved in receiving the request from the input device processor.

11. A system for generating and transmitting a generative artificial intelligence (AI) multimedia content via a mobile telecommunications network comprising:

a processor; and a non-transitory memory, wherein the non-transitory memory has instructions encoded thereon that, when executed by the processor, cause the system to:

receive, from an input device processor associated with an input device, a request to transmit a text message to a terminating mobile device, wherein the request comprises an invocation key indicating a user request to generate multimedia content, wherein the invocation key contains a predetermined special character, and wherein the request is input using a text messaging application of the input device;

parse the request to identify the invocation key indicating the user request to generate the multimedia content;

parse the request to identify a set of descriptors for generating the multimedia content;

generate, based on the set of descriptors, a prompt for providing to a generative AI model;

transmit, to the generative AI model, the generated prompt, wherein the generative AI model generates the multimedia content, wherein the generated prompt is transmitted to the generative AI model using a multimedia messaging service center of the system via an MM7 interface;

receive, by the multimedia messaging service center of the system, from the generative AI model, the generated multimedia content;

generate, by the multimedia messaging service center of the system the text message including the generated multimedia content; and transmit, to the terminating mobile device using the multimedia messaging service center of the system, the text message comprising the generated multimedia content.

12. The system of claim 11, wherein the invocation key comprises a string of predetermined characters indicated the user request for generating multimedia content.

13. The system of claim 11, wherein the multimedia content comprises at least one of: an image, a video, or an audio.

14. The system of claim 11, wherein the instructions, when executed by the processor, further cause the system to, prior to transmitting the generated multimedia content to the terminating mobile device:

transmit, to the input device, the generated multimedia content;

receive, from the input device, an indication to send the generated multimedia content to the terminating mobile device.

15. The system of claim 11, wherein the request includes an indication of a reference image for generating the multimedia content, and wherein transmitting the generated prompt comprises transmitting the reference image.

16. The system of claim 15, wherein the reference image is selected from one of: a local storage of the input device or a connected cloud service of a user of the input device.

17. The system of claim 11, wherein the request further comprises a request to translate a message, wherein the instructions, when executed by the processor, further cause the system to:

translate the message.

18. The system of claim 11, wherein the instructions, when executed by the processor, further cause the system to prior to transmitting the text message to the terminating mobile device:

determine that a user of the input device has received at least a minimum number of messages from a receiving user.

19. The system of claim 11, further comprising, prior to generating the prompt:

determining one or more enrichments based on information about a user of the input device, the information including one or more of: an age of the user, a location of the user, a current weather at the location of the user, a forecasted weather at the location of the user, or an upcoming event of the user.

20. A non-transitory, computer-readable storage medium comprising instructions recorded thereon, wherein the instructions when executed by at least one processor of a system, cause the system to:

receive, from an input device processor, a request to transmit a text message to a terminating mobile device, wherein the request comprises an invocation key indicating a user request to generate multimedia content, wherein the invocation key contains a predetermined special character, and wherein the request is input using a text messaging application of the input device;

parse the request to identify the invocation key indicating the user request to generate the multimedia content;

parse the request to identify a set of descriptors for generating the multimedia content;

generate, based on the set of descriptors, a prompt for providing to a generative AI model;

transmit, to the generative AI model using a multimedia messaging service center of a mobile telecommunications network associated with the system, via an MM7 interface, the generated prompt, wherein the generative AI model generates the multimedia content;

receive, using the multimedia messaging service center, from the generative AI model, the generated multimedia content;

generate, using the multimedia messaging service center, the text message including the generated multimedia content; and transmit, to the terminating mobile device using the multimedia messaging service center, the text message comprising the generated multimedia content.

* * * * *